United States Patent [19]
Higdon

[11] Patent Number: 5,375,363
[45] Date of Patent: Dec. 27, 1994

[54] DECOY

[76] Inventor: Mark Higdon, 230 Lake Pointe Dr., Paducah, Ky. 42003

[21] Appl. No.: 91,351

[22] Filed: Jul. 14, 1993

[51] Int. Cl.⁵ ............................................. A01M 31/06
[52] U.S. Cl. ........................................................ 43/3
[58] Field of Search ................ 43/2, 3; 446/97, 99, 446/100; D22/125

[56]  References Cited

U.S. PATENT DOCUMENTS

| | | | |
|---|---|---|---|
| 2,174,211 | 9/1939 | Hutaff | 43/3 |
| 2,196,078 | 4/1940 | Pearce | 43/3 |
| 2,457,295 | 12/1948 | Woodhead . | |
| 2,545,800 | 3/1951 | Viken . | |
| 2,691,233 | 10/1954 | Richardson . | |
| 2,760,303 | 8/1956 | Del Mas | 446/97 |
| 2,942,370 | 6/1960 | Zaruba | 43/3 |
| 3,050,895 | 8/1962 | Bratland | 43/3 |
| 3,350,808 | 11/1967 | Mitchell . | |
| 3,927,485 | 12/1975 | Thorsnes, Jr. . | |
| 4,965,953 | 10/1990 | McKinney | 43/2 |
| 5,189,823 | 3/1993 | Lanius | 43/3 |
| 5,205,060 | 4/1993 | Franceschini | 43/3 |
| 5,231,780 | 8/1993 | Gazalski | 43/3 |

FOREIGN PATENT DOCUMENTS 193738  3/1923  United Kingdom ..................... 43/3

Primary Examiner—Kurt Rowan
Attorney, Agent, or Firm—Camoriano & Smith

[57] ABSTRACT

A decoy has a moveable neck which can be flexed in many different directions and which automatically returns to its upright position.

20 Claims, 5 Drawing Sheets

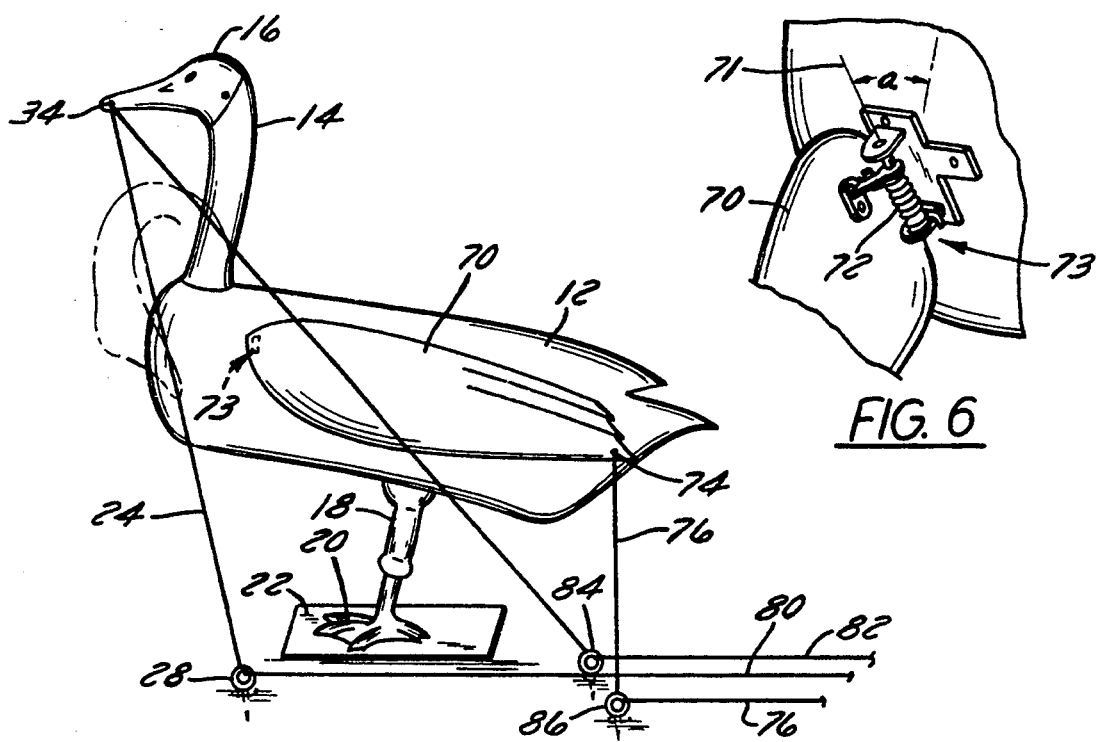
FIG. 5
FIG. 6
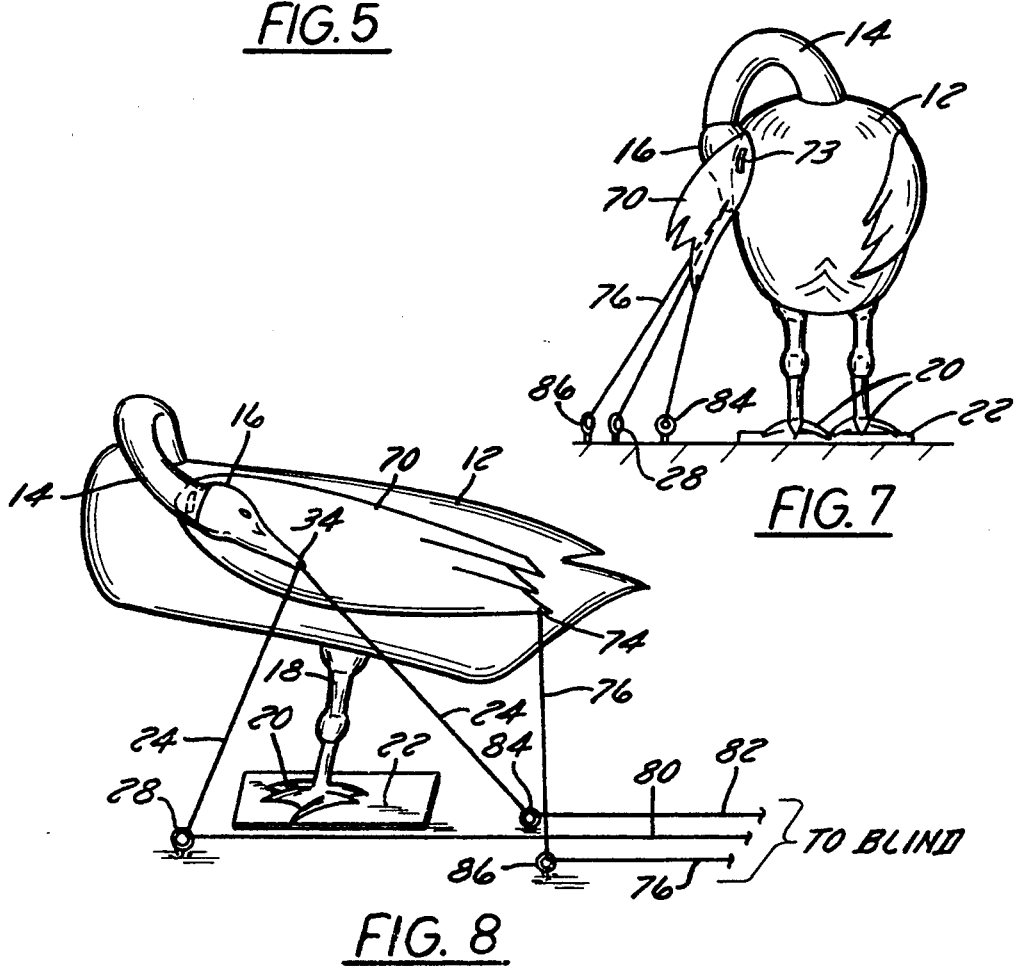
FIG. 7
FIG. 8

5,375,363

1

DECOY

BACKGROUND OF THE INVENTION

The present invention relates to decoys, and, in particular, to a decoy which can be made to move in order to imitate a real bird.

Decoys are well-known and have been used for many years to attract birds to hunting areas. Some decoys are movable, with the head and/or wing being able to move. However, the known decoys do not mimic the actual movements of a real bird as accurately as the present invention.

If the prior art decoys are moveable, they typically can move only in a single direction, such as up and down, and the movements are relatively stiff and do not imitate the natural movements of a bird, such as preening itself, feeding to the side and front, and looking around. Some decoys have very complicated internal parts which make the decoys expensive and difficult to maintain.

SUMMARY OF THE INVENTION

The present invention provides a decoy which has a very simple construction and which closely imitates the actual movements of a live bird.

The present invention provides a decoy which is moveable in many different directions.

The present invention provides a simple decoy which can easily make many of the natural movements of a bird, such as preening its back, wing, and chest, feeding to the side and front, shaking its head, and looking around.

BRIEF DESCRIPTION OF THE DRAWINGS

FIG. 5 shows a second alternative embodiment of the invention, in which the wing also moves;

FIG. 6 is an enlarged view of the wing mechanism of the decoy of FIG. 5;

FIG. 7 is a rear view of the decoy of FIG. 5 with the head and wing moved;

FIG. 8 is a side view of the decoy of FIG. 7;

DESCRIPTION OF THE PREFERRED EMBODIMENTS

Figure 1:
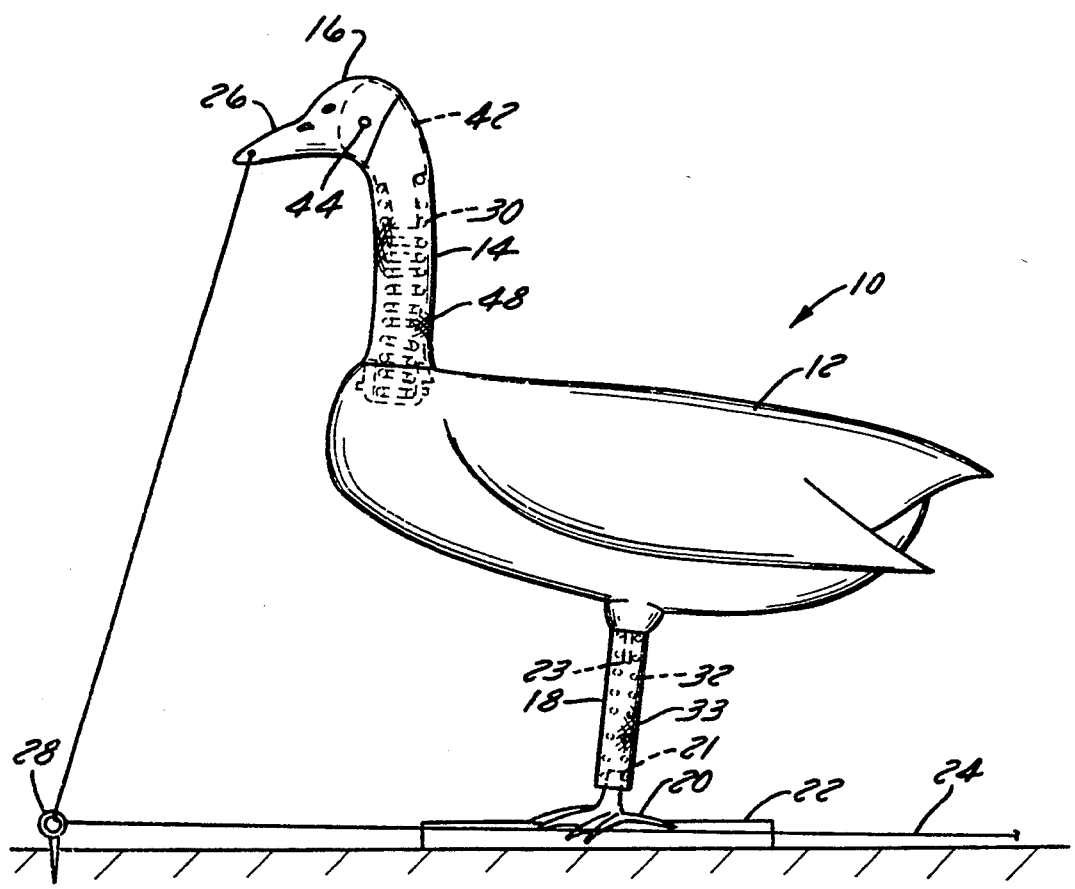
FIG. 1 is a side view of a decoy made in accordance with the present invention.
Figure 2:
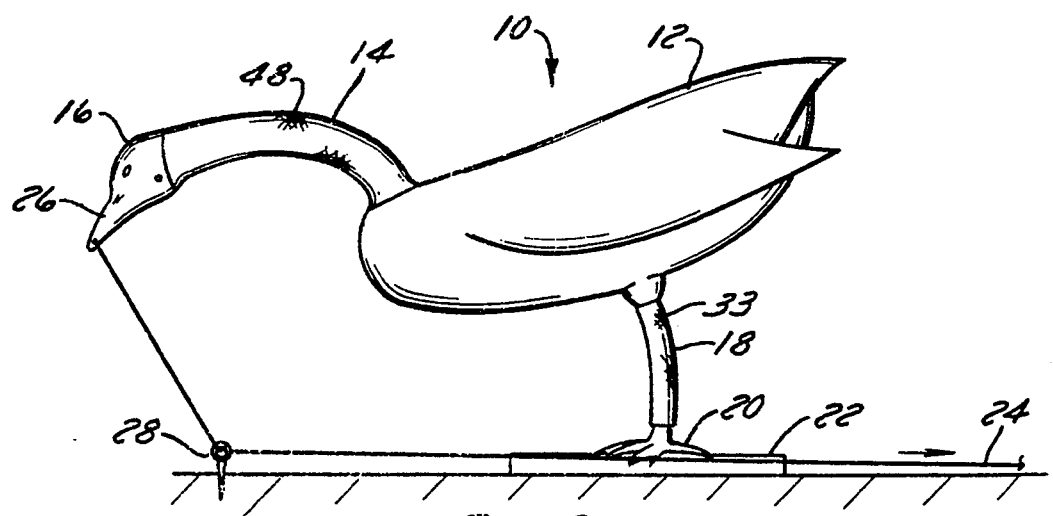
FIG. 2 is a view of the decoy of FIG. 2 bent forward, with the head looking down.

This description includes several alternative embodiments of the present invention. Corresponding parts in the various embodiments are given corresponding numbers. FIGS. 1 and 2 show a goose decoy made in accordance with the present invention. The decoy 10 includes a body portion 12, a neck 14, a head 16, and a leg 18 (or a pair of legs 18). Both the neck 14 and the leg 18 of this decoy 10 are flexible. The foot 20 of the decoy 10 is mounted on a flat board 22 to provide stability.

As is shown in FIG. 2, this decoy can be made to move by means of a string 24 which is attached to the beak 26 of the decoy, extends through an eyelet 28 which is mounted in the ground or on a board, and extends into the hunting blind (not shown) where the hunter is. When the hunter pulls the string 24, the decoy's head bends down in a very natural way, with the neck 14 curved gracefully. The legs 18 will permit the body to bend forward much more readily than to the side, because moving to the side would require the compression of one leg spring and the extension of another, and the leg springs do not readily compress.

FIG. 1 shows that there is a spiral coil spring 30 inside the neck 14 and a spiral coil spring 32 in each of the legs 18. The springs 32 in the legs 18 are stiffer than the spring 30 in the neck, so the neck bends more readily than the legs 18. The spiral coil springs 30, 32 are the best mode for obtaining the flexibility and the return to starting position, but other resilient, multi-directional flexible members, such as a flexible fiberglass pole or a piece of spring steel could be used instead of the coil springs 30, 32. There is a flexible leg covering 33, which covers the leg spring 32 to make the leg look natural, and a flexible neck covering 48, which covers the neck spring 30 to make the neck look natural. These spiral springs 30, 32 permit the neck and leg to bend gracefully in any direction and then return the neck and leg to the upright position of FIG. 1 when the string tension is released.

FIG. 1 shows that the foot 20 includes an upward projection 21 which fits up inside the leg spring 32, and the body 12 includes a downward projection 23, which fits down into the leg spring 32. This permits the hunter to leave the foot 20 mounted on the board out in the field and to remove the rest of the decoy 10 when he is not hunting by lifting the body and its projection 23 out of the leg 18, or by lifting the body and the leg 18 and leaving the foot 20. This is important, because, if the decoys sit lifeless in the field for a long time, the birds which fly over will recognize them to be decoys and will not respond to them as the hunter wishes. The decoys should be in the field only when the hunter is available to manipulate them and make them look lifelike. In order to make the setup and removal quick and easy, it is important for the hunter to be able to set up the foot 20 and the string 24 and to quickly attach and remove the decoy 10 to and from its string 24 and its foot 20.

Figure 3:
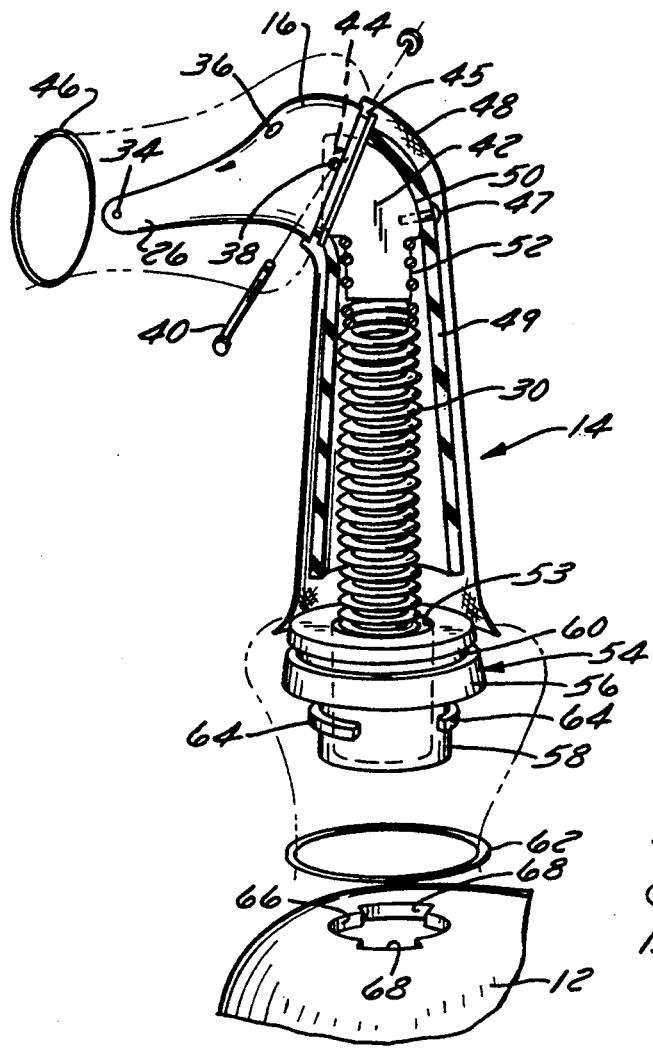
FIG. 3 is a view of the head and neck of the decoy of FIG. 1 partially in section.

FIG. 3 shows the head and neck portion of the decoy of FIG. 1 in more detail. The head 16 is a hollow piece and has a hole 34 through the beak 26 for attaching the string. The back portion of the head 16, behind the eye 36 defines a horizontal hole 38 which receives a pivot pin 40. The hollow back portion of the head 16 also receives the neck-head connector piece 42. The neck-head connector piece 42 also has a horizontal hole 44, which is aligned with the hole 38 in the head, so that the pivot pin 40 fits through those aligned holes to pivotably connect the head and the neck-head connector 42 together. The hollow interior of the head 16 is large enough to permit the head 16 to pivot relative to the neck-head connector piece 42.

Behind the pivot hole 38, there is an annular indentation 45 in the outer surface of the head 16, which permits the head 16 to receive an O-ring 46 for securing the flexible neck covering 48 to the head 16. A foam rubber tube 49 fits between the neck spring 30 and the outer cloth covering 48 to give the neck 14 the proper form and to prevent the cloth 48 from getting into the spring 30. The foam rubber tube 49 is fastened to the neck-head connector 42 by means of a screw 47.

Looking again at FIG. 3, the neck-head connector piece 42 extends horizontally at the top, vertically at the bottom, and has a curved portion 50 which makes the transition from the horizontally-projecting portion to the vertically-projecting portion. The diameter of the curved portion 50 is larger than the diameter of the downwardly-projecting, threaded cylindrical portion 52, so the spiral spring 30 is threaded onto the downwardly-projecting threaded cylindrical portion 52 and is stopped by the larger-diameter curved portion 50.

Still referring to FIG. 3, the bottom of the spring 30 is received in a cylindrical hole 53 in the neck-to-body connecting piece 54. The neck-to-body connecting piece 54 has a cylindrical shape with a large-diameter upper portion 56 and a smaller diameter lower portion 58. The upper portion 56 defines an annular indentation 60 for receiving a second O-ring 62, which retains the flexible neck covering 48 on the connecting piece 54. The smaller diameter lower portion 58 defines two outwardly-projecting bosses 64 which have a larger outside diameter than the diameter of the hole 66 on the body 12. The hole 66 on the body 12 has two extensions 68 which are sized to receive the bosses 64. To install the head 16 of FIG. 3 onto the body 12, the neck-to-body connector 54 is rotated ninety degrees, aligning the bosses 64 on the neck-to-body connector 54 with the extensions 68 of the hole 66 in the body 12. The neck-to-body connector 54 is then moved downward, with the bosses 64 moving through the openings 68 until the large diameter upper portion 56 of the neck-to-body connector 54 rests on the top surface of the body 12. The neck-to-body connector 54 is then rotated back ninety degrees, so the bosses 64 are retained in the body 12. The distance between the bosses 64 and the large-diameter portion 56 of the neck-to-body connection 54 is approximately equal to the thickness of the material from which the body 12 is made, so that there is not much room for play once the neck-to-body connector is installed on the body.

Figure 4:
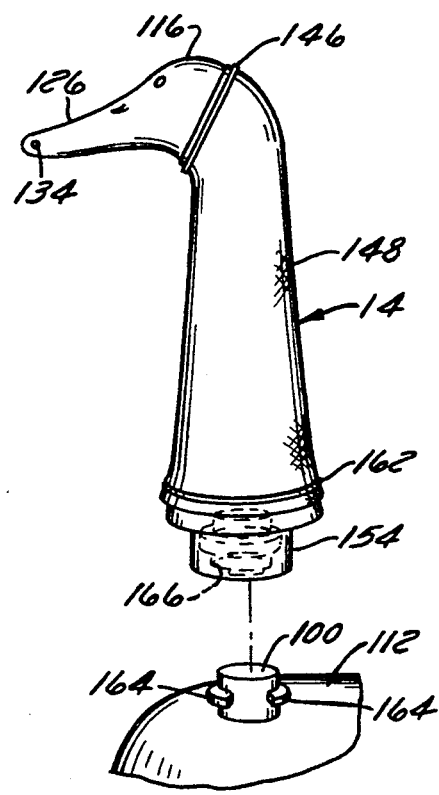
FIG. 4 is an alternative embodiment of the head.

FIG. 4 shows an alternative method for connecting the neck 14 to the body 12. In this embodiment, there is an upwardly projecting member 100 on the body 112 which has outwardly-projecting bosses 164. The neck-to-body connector 154 of this embodiment receives the spring in a cylindrical hole as in the previous embodiment. However, the lower portion of the neck-to-body connector 154 defines a hole 166 which is shaped similarly to the hole 66 in the embodiment shown in FIG. 3, so that the projection 100 on the body fits up into the hole 166 in the neck-to-body connector 154 and is then rotated ninety degrees to retain the head and neck on the body.

Figure 9:
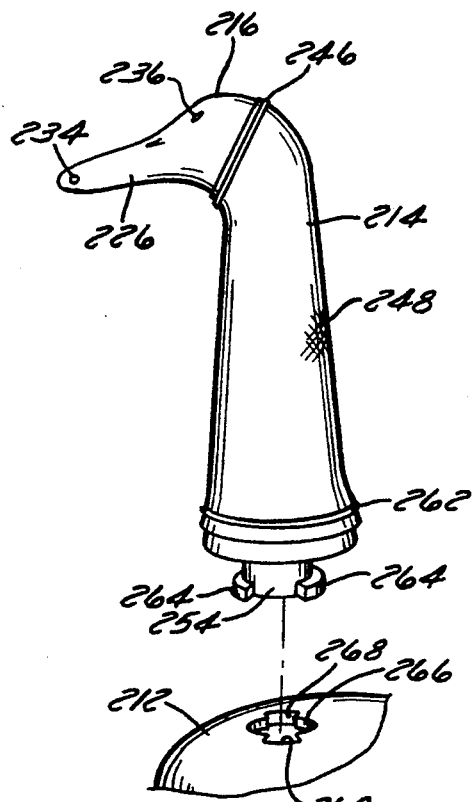
FIG. 9 shows another alternative neck-to-body connection.

Three other alternative arrangements for mounting the neck on the body are shown in FIGS. 9-11A. FIG. 9 is very similar to FIG. 3, except that the bosses 264 define the end of the neck-to-body connector 254 in that embodiment.

Figure 10:
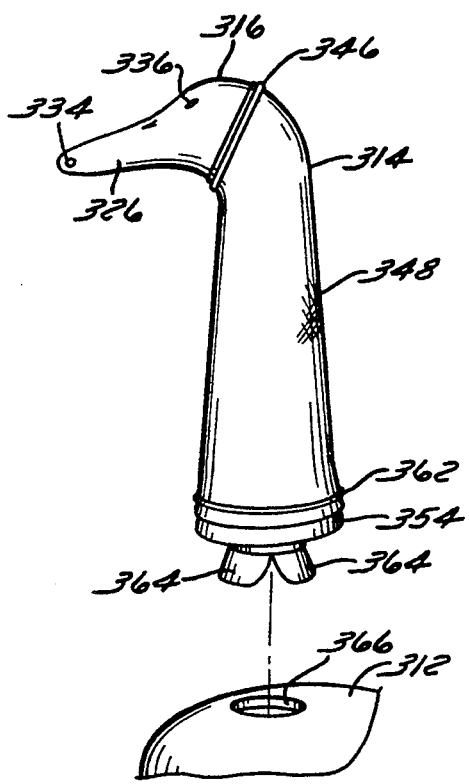
FIG. 10 shows another alternative neck-to-body connection.

FIG. 10 has a pair of flexible ears 364 projecting from the neck-to-body connector 354. The hole 366 in the body 312 of FIG. 10 is circular. To install the neck 314 on the body 312, the flexible ears 364 are flexed inwardly and inserted into the hole 366. Once they have been inserted into the hole 366, the ears 364 spring back to their original shape, retaining the neck 314 on the body 312.

Figure 11:
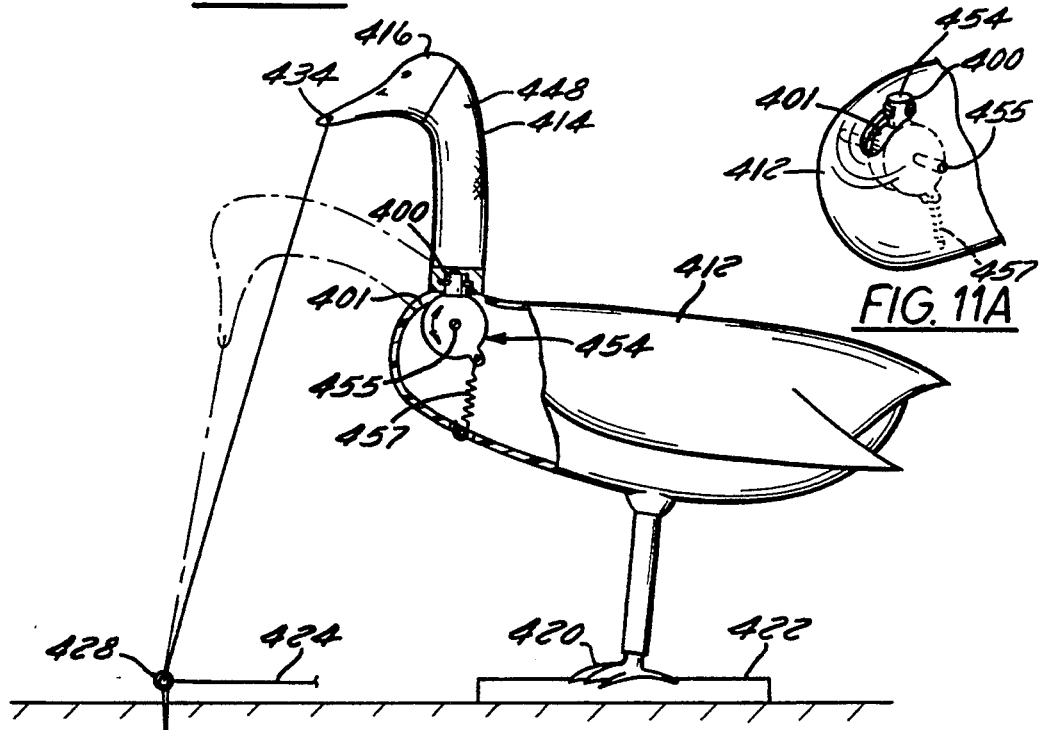
FIG. 11 shows an alternative embodiment in which the neck pivots about a pivot located in the body.
Figure 11A:
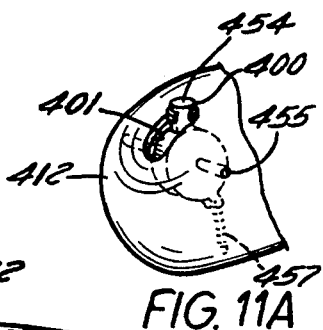
FIG. 11A is a perspective view of a portion of the embodiment of FIG. 11, showing the pivotable neck connection.

FIGS. 11 and 11A have a pivoting neck-to-body connector 454. This connector 454 pivots about a horizontal pivot pin 455 which is mounted onto the body 412, and a spring 457 extends from the connector 454 to the bottom of the body 412, to return the connector 454 to the upright position when string tension is removed. The connector 454 has an upward projection 400, and the neck mates with that projection 400 as in FIG. 4. The flexible neck covering 448 is retained in the same manner as in FIG. 4. There is a slot 401 in the front of the body of this decoy, to permit the neck-to-body connector 454 to pivot forward, which allows the neck to pivot forward.

Figure 12:
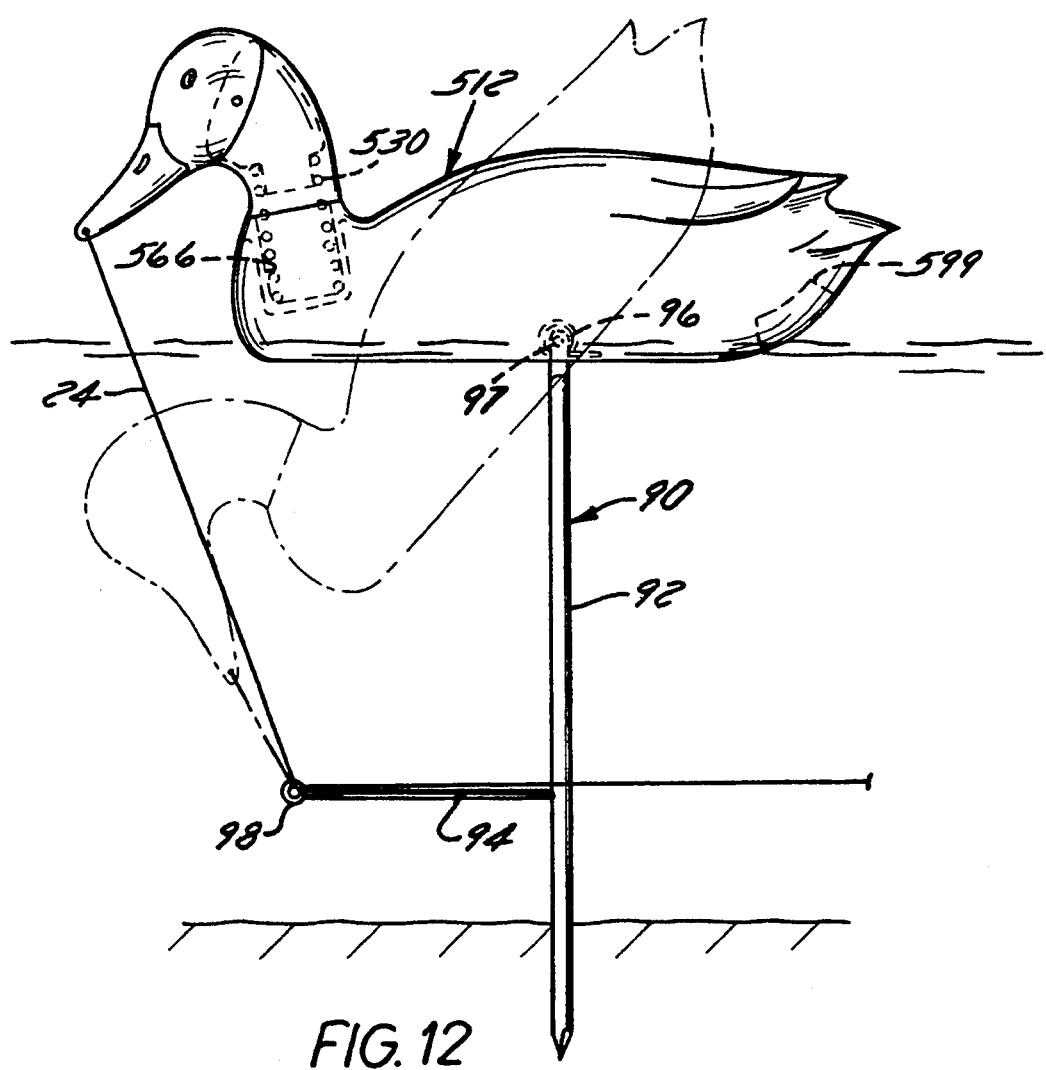
FIG. 12 shows a duck made in accordance with the present invention mounted on a stake in the water.

FIG. 12 shows another alternative embodiment, in which the neck spring 530 is received in a cylindrical indentation 566 in the body.

The decoy 10 of FIGS. 5-8 is identical to the decoy of FIGS. 1-3, except that it has a wing 70 which can be moved relative to the body 12. As is shown in FIG. 6, the wing 70 is hinged to the body 12 and pivots about an axis 71, which lies at an angle alpha from the vertical. The angle alpha is preferably between 15 degrees and 45 degrees, so that the wing opens outward and downward. A spring-biased hinge assembly 73 is located between the body 12 and the wing 70 to allow wing movement. A wing return spring 72 on the hinge assembly 73 causes the wing to lie against the body 12 when string tension is removed. The wing 70 defines a hole 74 near the wingtip, which receives a string 76 for controlling the movement of the wing 70.

In the arrangement shown in FIGS. 5-8, three string ends extend back into the blind (not shown). The string 24, which goes through the hole 34 through the beak 26, has two ends 80, 82 which go back to the blind. The first end 80 extends through the eyelet 28 and then to the blind. The second end 82 extends through another eyelet 84 and then back to the blind. The string 76 from the wing 70 extends through the eyelet 86 and then back to the blind.

With this arrangement, several different motions are possible. By pulling the string 76, the wing can be moved outwardly, away from the body. If the second end 82 of the string 24 is held and the first end 80 is pulled, the head will bend down. If the second end 82 is pulled, the head will curve back toward the wing 70. In this way, the head 16 can be put under the wing 70 to simulate sleeping. A person of ordinary skill in the art can imagine that many different natural motions are possible with this arrangement.

The embodiment of the decoy 512 shown in FIG. 12 is mounted on a pole 90 which is staked out in the water. The pole 90 has a vertical portion 92 and a horizontal portion 94. The vertical portion terminates at its upper end in a pivot connection 96 to the body of the decoy. The pin 97 which creates the pivot connection 96 is a quick-disconnect pin, so the body of the decoy can readily be removed from the pole 90. At the lower end of the pole 90 is a sharp point which can be driven into the ground. The horizontal portion 94 of the pole 90 terminates in an eyelet 98, which receives the string 24 that is connected to the beak 26 of the decoy. The other end of the string extends into the blind. When the hunter pulls the string 24 in this embodiment, the head bends downward, and the body pivots downward about the pivot connection 96 to simulate a duck diving into the water for food. The buoyancy and weight 599 return the duck to the surface when the string tension is removed.

The embodiments shown herein have been in the shape of a goose and a duck. Of course, many other types of birds could also be represented by the decoy of the present invention. It will also be obvious to those skilled in the art that modifications may be made to the embodiments described herein without departing from the scope of the present invention.

What is claimed is:

1. A decoy, comprising:
   a body portion;
   a head portion; and
   a flexible neck portion including a spiral coil neck spring interconnecting the body and the head; wherein said neck spring supports the weight of the head, so that the head can flex forward and down and to the side to imitate a feeding movement and can flex back and to the side to preen, defines the curvature of the neck, permits the neck to flex away from a starting position when a force is applied to the head, and returns the neck to the starting position when the force is removed from the head.

2. A decoy as recited in claim 1, and further comprising a head-to-neck connecting member which is pivotably mounted to the head and which mates with the neck spring.

3. A decoy as recited in claim 2, wherein the head of said decoy defines an eye, and wherein said head-to-neck connecting member pivots relative to the head at a point which lies behind the eye.

4. A decoy as recited in claim 1, wherein said head includes a beak which defines a hole for mounting a control string.

5. A decoy as recited in claim 1, and further comprising a mounting pole for mounting said decoy in the water, wherein said mounting pole is pivotably connected to the body of said decoy.

6. A decoy as recited in claim 1, and further comprising:
   a wing, said wing being hinged to the body by means of a spring-loaded hinge, said spring-loaded hinge tending to return the wing to a position lying against the body portion.

7. A decoy, comprising:
   a body portion.;
   a head portion; and
   a neck portion including a spiral coil neck spring interconnecting the body and the head,
   and further comprising a leg projecting downwardly from said body portion, said leg including a foot and a spiral coil leg spring interconnecting said foot and said body.

8. A decoy as recited in claim 7, wherein said body can readily be disconnected from said foot.

9. A decoy, comprising:
   a body portion;
   a head portion; and
   a resilient, multidirectional flexible neck member interconnecting the body and the head, so that the head can flex forward and down and to the side to imitate a feeding movement, and can flex back and to the side to preen, wherein said flexible neck member defines the curvature of the neck, flexes away from the starting position when force is applied to the head, and returns to the starting position when the force is removed.

10. A decoy as recited in claim 9, and further comprising:
    a foot; and
    a resilient, multi-directional flexible leg member interconnecting the body and the foot.

11. A decoy as recited in claim 9, and further comprising a head-to-neck connecting member which is pivotably mounted to the head and which mates with the resilient, multi-directional flexible neck member.

12. A decoy as recited in claim 11, wherein the head of said decoy defines an eye, and wherein said head-to-neck connecting member pivots relative to the head at a point which lies behind the eye.

13. A decoy as recited in claim 9, wherein said head includes a beak which defines a hole for mounting a control string.

14. A decoy as recited in claim 10, wherein said body can readily be disconnected from said foot.

15. A decoy as recited in claim 9, and further comprising a mounting pole for mounting said decoy in the water, wherein said mounting pole is pivotably connected to the body of said decoy.

16. A decoy as recited in claim 9, and further comprising:
    a wing, said wing being hinged to the body by means of a spring-loaded hinge, said spring-loaded hinge tending to return the wing to a position lying against the body portion.

17. A decoy as recited in claim 16, wherein said wing pivots about an axis which lies from 15 degrees to 45 degrees from the vertical, so as to open downward and outward.

18. A decoy as recited in claim 9, and further comprising:
    a pole adapted to be driven into the ground, said pole including a pivot connection to said decoy body.

19. A decoy as recited in claim 18, wherein said pivot connection includes a pivot pin which can be quickly disconnected for removing said decoy from said pole.

20. A decoy as recited in claim 19, wherein said pole further comprises an arm defining a hole for receiving a control string.

* * * * *